Aug. 5, 1930.  J. L. DRAKE  1,772,072
PROCESS AND APPARATUS FOR FORMING SHEET GLASS
Filed Oct. 6, 1927
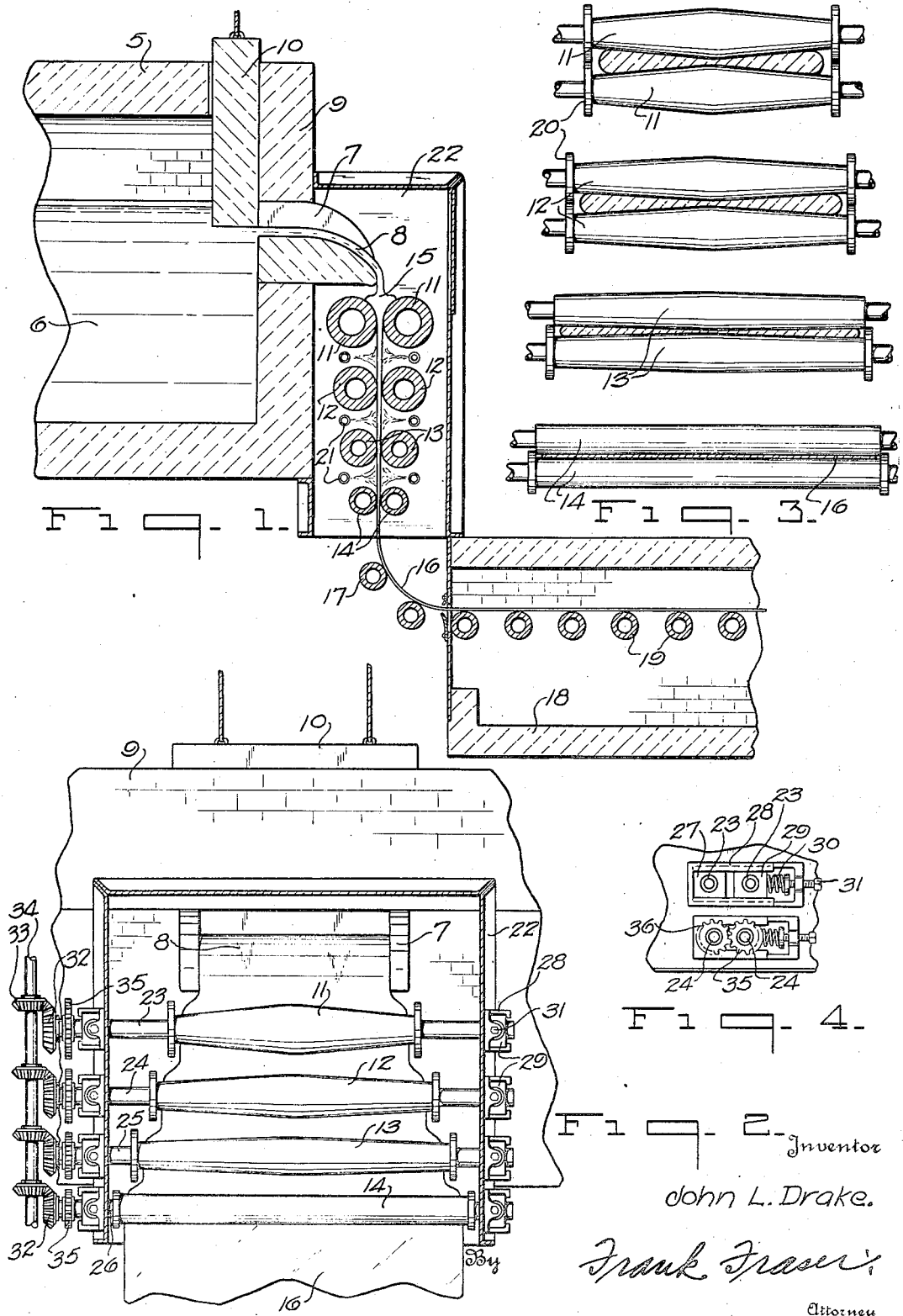
Inventor
John L. Drake.
By Frank Fraser
Attorney Patented Aug. 5, 1930

1,772,072

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING SHEET GLASS

Application filed October 6, 1927. Serial No. 224,354.

The present invention relates to an improved process and apparatus for forming sheets of glass which are especially well adapted for use as plate glass blanks, although they are not necessarily restricted to such use.

An important object of the invention is to provide such a process and apparatus whereby plate glass blanks can be easily and quickly formed, the said blanks being exceptionally flat and having substantially predetermined dimensions.

Another object of the invention is to provide such a process and apparatus of this nature wherein a relatively thick, narrow stream of molten glass is flowed from a molten bath and gradually reduced through successive stages to a sheet of substantially predetermined dimensions.

Another object of the invention is to provide such a process and apparatus of this nature for producing sheets of glass well adapted for use in plate glass manufacture, wherein is created a mass of molten glass which is then reduced to a sheet of substantially predetermined dimensions by spreading it outwardly from its center.

A further object is to provide such a process and apparatus wherein a relatively thick, narrow stream of molten glass is flowed from a molten source and passed between a plurality of pairs or sets of forming members which serve to gradually reduce the stream to a sheet of substantially predetermined thickness and width, means being provided for preferably driving the forming members at respectively increasing speeds to maintain proper longitudinal tension in the sheet being formed.

Still another object is to provide such a process and apparatus wherein a plurality of pairs of rolls are preferably arranged in superimposed relation, a relatively thick, narrow stream of molten glass being flowed upon the uppermost pair of rolls and passed downwardly through the succeeding pairs, each succeeding pair of rolls serving to reduce the thickness of the stream while simultaneously increasing its width, the molten glass being spread from the center outwardly.

Other objects and advantages of the invention will become more apparent during the course of the following description when taken in connection with the accompanying drawings.

In the drawings forming a part of this application and wherein like numerals are employed to designate like parts throughout the same.

Fig. 1 is a vertical longitudinal section through improved sheet forming apparatus constructed in accordance with the present invention.

Fig. 2 is a front view thereof, partially in section.

Fig. 3 is a view showing the construction of the various pairs of rolls, and

Fig. 4 is a detail view showing the mounting for the rolls.

The numeral 5 designates one end of a furnace or other suitable container wherein is produced a mass of molten glass 6, the furnace being provided at one end thereof with an overflow lip or spout 7 through which the molten glass is adapted to flow in a relatively thick, narrow stream 8. The spout 7 is preferably arranged in the front wall 9 of the furnace somewhat below the normal level of the mass of molten glass therein and is relatively narrow as shown in Fig. 2 so that the relatively thick, narrow stream 8 will be caused to flow therefrom under the head pressure of its mass, the amount of glass flowing from the furnace being controlled by an adjustable gate or closure member 10.

Positioned beneath the overflow spout 7 are a plurality of pairs or sets of forming rolls 11, 12, 13 and 14 arranged in substantially vertical alignment with one another with the rolls of each pair being spaced to permit the glass to pass downwardly therebetween. The several pairs of rolls are of respectively increasing lengths from the uppermost rolls 11 to the lowermost rolls 14. The rolls 11, 12 and 13 gradually taper from their centers towards their opposite ends while the lowermost rolls 14 are cylindrical to form a straight sheet forming pass therebetween having parallel sides. The degree of taper of the several sets of rolls gradually decreases from the uppermost pair to the lowermost pair so that the rolls gradually approach cylindrical form. The rolls 14 are arranged relatively close together and are adapted to determine the thickness of sheet produced.

Due to the particular construction of the forming rolls, the space between the rolls of each succeeding pair is less than the space between the rolls of the preceding pair so that the stream of molten glass passing downwardly between the pairs of rolls is gradually reduced in thickness. Furthermore, because of the formation of the rolls, the glass is spread outwardly from the center toward the opposite ends thereof and thus, the stream while being gradually reduced in thickness is simultaneously increased in width so that the resultant sheet will be of substantially predetermined dimensions.

The relatively thick, narrow stream of molten glass 8 flowing from the spout 7 is adapted to be received upon the uppermost pair of rolls as at 15 and is then permitted to pass downwardly between the several pairs of rolls whereby it is reduced through successive stages, to a sheet of substantially predetermined dimensions, each succeeding pair of rolls serving to decrease the thickness of the stream while simultaneously increasing its width as clearly illustrated in Figs. 2 and 3. In other words, there is first created a mass of molten glass which is then reduced through successive stages to a sheet of substantially predetermined dimensions by spreading it outwardly from its center. The mass of glass between the uppermost rolls 11 is relatively thinner at its center than at its ends and the end portions are then gradually reduced to the same thickness as the center by spreading the glass outwardly as it passes downwardly between the succeeding pairs of rolls. Thus, the molten glass fed to the forming rolls is first reduced in thickness at its center after which the end portions are reduced to the same thickness by spreading the glass outwardly from its center.

The resultant sheet 16 may be carried upon a number of rolls or other suitable conveying means 17 into an annealing leer 18 wherein it is supported and carried along upon a series of horizontally arranged rolls 19. Each pair of rolls may also be provided at its opposite ends with collars or the like 20 which serve to prevent the molten glass from flowing outwardly beyond the ends of said rolls. Burners or other suitable heating means 21 can also be utilized to control the temperature of the glass as it passes between the several pairs of rolls whereby to maintain the same in a plastic workable condition. A housing or casing 22 may be employed to enclose the flow spout 7 and forming rolls, if desired, the lower end thereof being preferably open to permit the sheet to pass therefrom into the leer.

In accordance with the present invention, the sheet forming rolls are adapted to be driven at respectively increasing speeds and are also mounted in a manner that the rolls of each pair are yieldably urged toward one another. To this end, the pairs of forming rolls 11, 12, 13 and 14 are mounted upon shafts 23, 24, 25 and 26 respectively. One shaft of each pair is mounted at each end in a journal 27 fixed within the guide-way 28 while the other roll of each pair is mounted at each end in an adjustable journal 29 slidably supported within said guide-way 28 and normally urged toward the stationary journal by means of a spring 30. By rotating the adjusting screws 31, the distance between the rolls of each pair can be varied as desired.

For the purpose of driving the several sets of rolls, one of the shafts 23 to 26 inclusive carries a bevel gear 32 meshing with a bevel gear 33 carried by a drive shaft 34, the gears 32 progressively decreasing in size from the uppermost gear to the lowermost gear so that the rolls will be driven at respectively increasing speeds from the uppermost rolls 11 to the lowermost rolls 14. Carried by each of the driven shafts 23 to 26 inclusive is a gear 35 meshing with a corresponding gear 36 on the opposite shaft of the pair so that the peripheral speeds of the corresponding rolls in each pair will be the same.

Since the rolls are driven at progressively increasing speeds, longitudinal tension will be maintained in that portion of the sheet between the rolls and also between the several sets of rolls so that there will be no tendency for the sheet to buckle as it is being formed, thus tending to eliminate waves or other inequalities which might result from lack of adequate longitudinal tension.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of forming sheet glass, which consists in creating a mass of molten glass, reducing the thickness of the mass first at its center, and in then reducing the end portions to the same thickness by spreading the mass from its center outwardly.

2. The process of forming sheet glass, which consists in reducing a relatively thick, narrow stream of molten glass to a sheet of substantially predetermined dimensions by reducing the thickness of the stream first at its center, and in then spreading the glass through successive stages from its center outwardly to gradually reduce the end portions to the same thickness as the center.

3. In apparatus for forming sheet glass, a plurality of pairs of rolls for receiving a relatively thick, narrow stream of molten glass, and gradually reducing it to a sheet of substantially predetermined thickness and width, said rolls being constructed to reduce the thickness of the stream first at its center and to then reduce the end portions to the same thickness by spreading the glass outwardly from its center.

4. In apparatus for forming sheet glass, a plurality of pairs of sheet forming rolls, the rolls of the uppermost pair tapering from their centers toward their opposite ends with the succeeding pairs of rolls gradually approaching cylindrical form, and means for feeding a stream of molten glass upon the uppermost pair of rolls.

5. In apparatus for forming sheet glass, a plurality of pairs of superimposed sheet forming rolls, the rolls of the uppermost pair tapering from their centers toward their opposite ends with the succeeding pairs of rolls gradually approaching cylindrical form, means for feeding a stream of molten glass upon the uppermost pair of rolls, and means for driving the pairs of rolls at respectively increasing speeds from the uppermost rolls to the lowermost rolls.

6. The process of forming sheet glass, which consists in advancing a stream of molten glass, reducing the thickness of the stream first at its center, and in then reducing the end portions of the stream to the same thickness.

7. The process of forming sheet glass, which consists in advancing a stream of molten glass, rolling the stream first at its center to reduce the thickness thereof, and in then rolling the end portions of the stream to form a sheet of substantially predetermined uniform thickness.

8. The process of forming sheet glass, which consists in advancing a stream of molten glass, thinning the stream first at its center, and in then thinning the end portions of the stream to form a sheet of substantially predetermined thickness.

9. The process of forming sheet glass, which consists in advancing a stream of molten glass, thinning the stream first at its center, and in then thinning the end portions of the stream by spreading the glass through successive stages from the center outwardly to form a sheet of substantially predetermined thickness.

10. In apparatus for forming sheet glass, a plurality of pairs of rotatable members for receiving a supply of molten glass and reducing it to a sheet of substantially predetermined thickness, said members being constructed to reduce the thickness of the molten supply first at its center and then at its ends.

11. In apparatus for forming sheet glass, a plurality of pairs of sheet forming rolls, the rolls of the first pair tapering from their centers toward their opposite ends and the last pair of rolls being substantially cylindrical, and means for feeding a supply of molten glass to the first pair of rolls.

12. In apparatus for forming sheet glass, a plurality of pairs of sheet forming rolls, the rolls of the first pair tapering from their centers toward their opposite ends with the succeeding pairs of rolls gradually approaching cylindrical form, and means for feeding a supply of molten glass to the first pair of rolls.

Signed at Toledo, in the county of Lucas and State of Ohio, this 4th day of October, 1927.

JOHN L. DRAKE.